March 23, 1943. J. D. MAULE 2,314,546
AIRPLANE STARTER COMBINATION
Filed Nov. 28, 1940 2 Sheets-Sheet 1
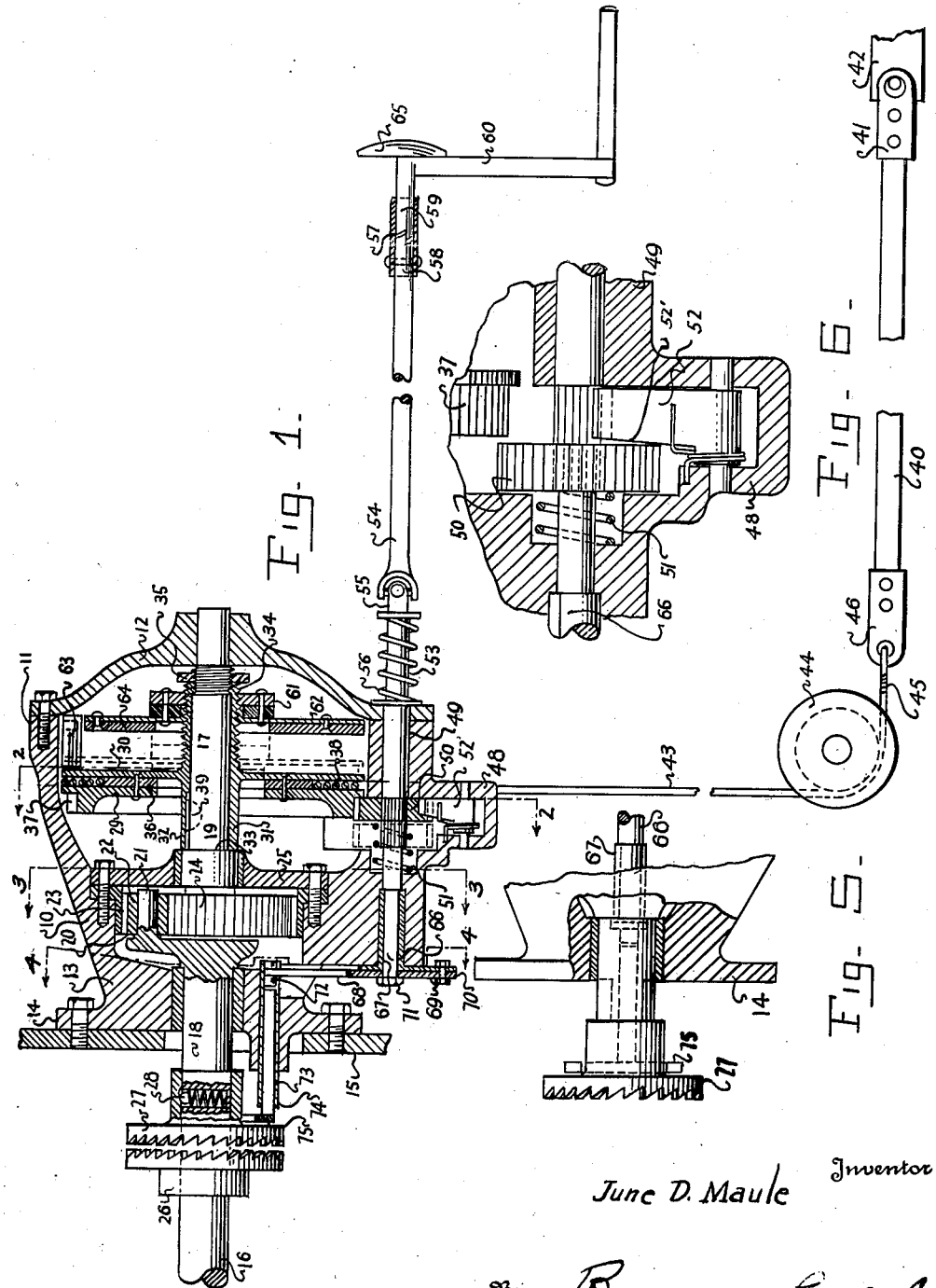
June D. Maule Inventor
By Berman & Langford
Attorney March 23, 1943. J. D. MAULE 2,314,546
AIRPLANE STARTER COMBINATION
Filed Nov. 28, 1940    2 Sheets—Sheet 2
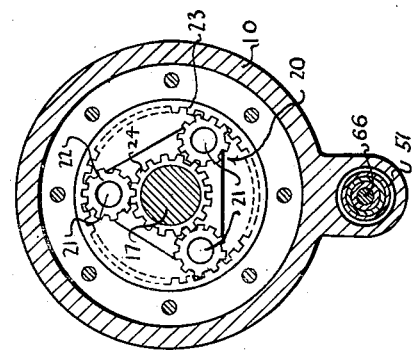
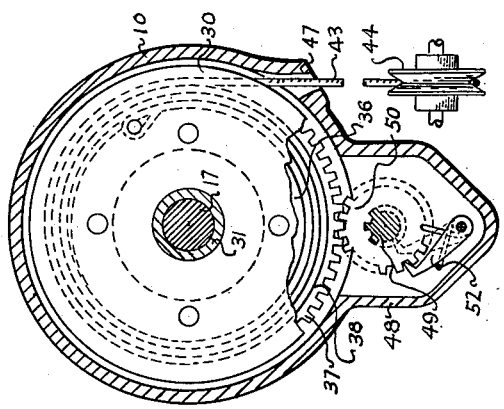
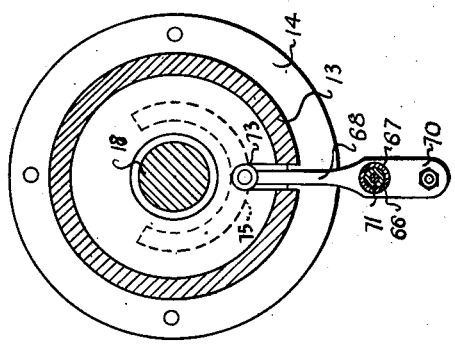
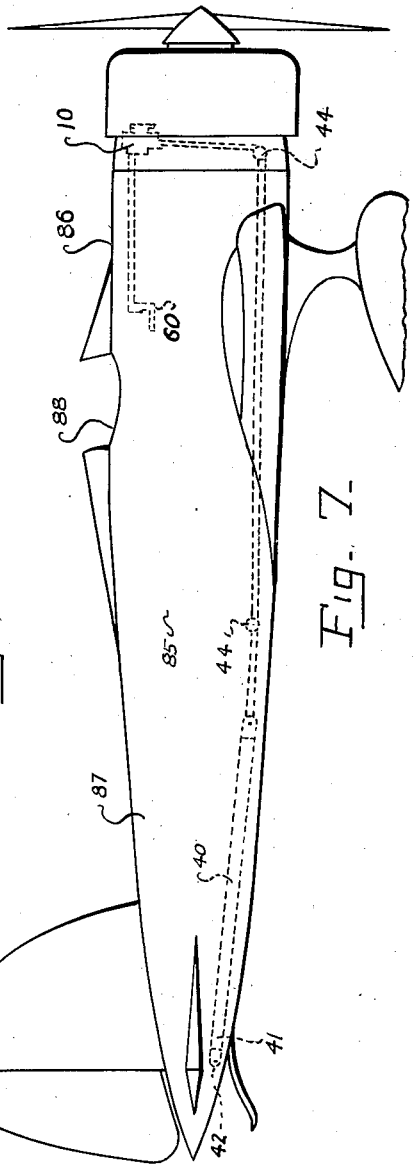
Inventor
June D. Maule
By Beaman & Langford
Attorney Patented Mar. 23, 1943

2,314,546

UNITED STATES PATENT OFFICE 2,314,546

AIRPLANE STARTER COMBINATION

June D. Maule, Michigan Center, Mich., assignor to The Aviation Corporation, Williamsport, Pa., a corporation of Delaware Application November 28, 1940, Serial No. 367,563

11 Claims. (Cl. 185—41)

My invention relates to airplanes and starters for the engines thereof.

One of the objects of the invention is to provide in combination with the fuselage of an airplane, a starter for the engine, located either at the forward end of the fuselage or to one side thereof, comprising as its activating mechanism an elongated longitudinally extensible element in the form of a rubber shock cord, or its equivalent, housed within the fuselage and extending rearwardly from the engine mounting to a point in the fuselage rearwardly of the usual location of the pilot's seat.

Another object is to provide in combination with the fuselage of an airplane, a starter for the engine located at the forward end of the fuselage comprising mechanism for highly tensioning a relatively long rubber shock cord, or its equivalent, housed in the fuselage and anchored at one end adjacent the tail and extending forwardly when tensioned to a point adjacent the engine mounting.

A further object is to provide a starter having a drum upon which a flexible yet relatively nonextensible cable is wound to extend a resilient longitudinally extensible member for storing up energy in the latter for engine cranking purposes.

A further object is to provide in combination with an airplane a starter having an elongated resilient energy member housed within the structure of the airplane so as to be fully protected from the weather and having clearance for substantially longitudinal extension and contraction with mechanism for storing energy in the resilient member and for selectively connecting the same to the engine for starting purposes.

These and other objects and advantages residing in the combination, construction and arrangement of parts will become apparent from a consideration of the following detailed description of the illustrated form of the invention and from the annexed claims.

In the drawings:

Fig. 1 is a cross-sectional view of the starter housing with the starter shown installed upon an engine mounting, Fig. 2 is a cross-sectional view taken on line II—II of Fig. 1, Fig. 3 is a cross-sectional view taken on line III—III of Fig. 1, Fig. 4 is a cross-sectional view taken on line IV—IV of Fig. 1, Fig. 5 is a fragmentary view of the clutch mechanism shown rotated through ninety degrees from that shown in Fig. 1, Fig. 6 is an enlarged fragmentary view of the pinion in ring gear releasing position, and Fig. 7 is a side elevational view of an airplane showing the installation of the starter.

In the accompanying drawings, wherein for the purpose of illustration, is shown a preferred embodiment of my invention, the numeral 10 designates a starter housing the end 11 of which is closed by the detachable plate 12. The opposite end 13 of the housing is formed with a radial flange 14 which is adapted to be connected to a suitable supporting wall 15 in a manner to support the housing in confronting relation to the starter shaft 16 of an internal combustion engine.

The drive shaft 17 is journaled for rotation within the housing 10 and in axial alignment with the starter shaft 16 of the engine. The shaft preferably comprises an idler section 18 and a drive section 19 operatively connected by a planetary gearing 20. For the adaption of the above connection the inner end of the idler section 18 is formed with a transverse substantially triangular plate having laterally extending shanks 21 which rotatably support the idler pinions 22. The idler pinions mesh with a stationary internal ring gear 23 and with the drive pinion 24 fixedly carried by the drive section 19, the inner end of the drive section being suitably supported by a transversely positioned bearing plate 25. The outer end of the drive section is journaled in the end plate 12 of the housing and the outer end of the idler section 18 extends through the end 13 of the housing in axial alignment with the starter shaft 16. A clutch plate 26 is fixedly mounted on the starter shaft and a companion clutch plate 27 is splined for sliding movement on the extending end of the idler section 18. The sliding clutch plate 27 is arranged in confronting relation with the stationary plate 26 but is normally held disengaged therefrom by the spring pressed detent 28.

The drum 29 is mounted on the drive portion 19 of the drive shaft and includes a radial flange 30 formed with an elongated sleeve 31 which snugly receives the drive shaft. The inner end 32 of the sleeve abuts the annular shoulder 33 formed on the shaft and the outer end 34 thereof is abuttingly engaged by the nut 35 threaded on the drive shaft. The annular shim 36 and the external ring gear 37 is riveted, or otherwise secured, to one side of the disk 30 to define the peripheral groove 38. The sleeve 31 is formed with an inwardly extending key 39 which is received within a registering slot in the drive shaft. The key holds the drum against rotation relative to the shaft and the nut 35 abuts the outer end of the sleeve to hold the drum against axial displacement relative thereto. An elastic shock cord 40 is shown housed within the fuselage 85 of the airplane 86 and has the distal end 41 thereof fixedly secured to a suitable support 42 in the tail 87 of the airplane 86. The cable 43 is threaded over the idler pulleys 44 rotatably mounted in the fuselage and has the end 45 thereof connected to the end 46 of the shock cord. The other end of the cable extends through the opening 47 in the housing for terminal connection in the peripheral groove 38 of the drum.

The portion of the starter housing below the drive shaft 17 is enlarged, as at 48, to accommodate the drum actuating means. The actuating means includes a spindle 49 which extends through the portion 48 of the housing in spaced parallel relation with the drive shaft. The pinion 50 is splined to the spindle for movement into and out of engagement with the external ring gear 37. The coil spring 51 bears against the pinion to normally urge the same into meshed engagement with the ring gear, and the spring influenced pivoted dog 52 engages the pinion in the last-mentioned position to hold the same against rotation in a clockwise direction. The end 53 of the spindle extends from the housing and is connected to the elongated link 54 by the universal joint 55. The coil spring 56 is interposed between the universal joint 55 and the housing and cooperates with the coil spring 51 to hold the pinion 50 in meshed engagement with the ring gear 37. The sleeve 57 is fixedly secured to the ratcheted end 58 of the link and extends therebeyond to receive the ratcheted end 59 of the crankhandle 60.

The link 54 extends from the starter to a suitable actuating position. If the starter is associated with an airplane as shown, the link is preferably extended into the cockpit 88 so that the pilot may operate the starter. The crankhandle 60 is detachably associated with the link and may normally be kept in any convenient location when not in use. Insertion of the handle within the sleeve will permit the link to be manually rotated in a clockwise direction. The above rotation will, in turn, be imparted to the pinion 50 which operates on the external ring gear 37 to rotate the same in a counterclockwise direction and to wind the cable 43 therearound. When substantially all of the cable has been wound around the drum, the shock cord 40 will be highly tensioned; however, the dog 52 will engage the pinion to hold the same against reverse rotation. Rotation of the drum to wind the cord therearound will be transmitted to the drive shaft 17 but, by virtue of the normally spaced relation of the clutch plates 26 and 27, such rotation will not be imparted to the driven shaft 16.

The collar 61 is threadedly received by the end 34 of the drum sleeve and has the circular plate 62 riveted, or otherwise secured, thereto. The plate 62 is of substantially the same diameter as the drum 29 and the periphery thereof is recessed to receive the elongated key 63. The key is fixed to the housing whereby rotation of the drum will effect a longitudinal movement of the plate 62 toward or away from the drum. The face of the plate 62 confronting the drum is provided with a brake lining 64 which frictionally engages the disk 30 of the drum when the cord 43 is entirely unwound from the drum. Rotation of the drum in the above-described manner to wind the cord therearound will move the collar 61 axially away from the drum to the full line position in Fig. 1. Release of the pinion 50 from the ring gear 37 will permit the tensioned shock cord 40 to unwind the cord from the drum. Rotation of the drum in a clockwise direction will move the collar in the direction of the drum and when the cable is unwound to a desired extent, the brake lining 64 will move into engagement with the radial flange 39 to prevent continued movement of the drum in a manner to wind the cord therearound in a reverse direction.

The operator may disengage the pinion 50 from the ring gear by pressing against the finger-piece 65 to axially move the spindle 49 within the housing. Axial movement of the spindle will move the pinion to the dotted line position in Figure 1 against the resilient action of the coil springs 51 and 56. The end 66 of the spindle is slidably received by the sleeve 67 and the spring arm 68 has the end 69 thereof fastened to the depending arm 70 of the sleeve. The intermediate portion of the spring arm is secured to the end 66 of the spindle by the bolt 71 and the upper end 72 thereof is disposed within the guide track 73. Axial movement of the spindle will, therefore, flex the spring arm to move the end 72 into engagement with the laterally extending shank 74 of the yoke 75. The yoke abuts the rearward face of the slidable clutch plate 27 and movement of the spring arm 68 into engagement with the shank 74 thereof will move the clutch plate 27 into engagement with the stationary clutch plate 26.

It may thus be seen that the operator first actuates the crankhandle 60 to wind the cable 43 around the drum 29. The winding of the cable around the drum will cause the brake collar 61 to move to a retracted position. Axial movement of the spindle 49 will disengage the pinion 50 from the external ring gear 37 and move the slidable clutch plate 27 into engagement with the stationary clutch plate 26. The release of the ring gear 37 will permit the tensioned shock cord to rapidly rotate the drum in a reverse direction, which rotation will then be imparted to the driven shaft 16 of the engine. Reverse actuation of the drum by the shock cord will also cause the brake lining 64 to frictionally engage the drum as soon as the cord 43 is entirely unwound therefrom.

Movement of the pinion 50 from the full line to the dotted line position shown in Fig. 1 releasing the ring gear 37 results in the dog 52 being urged into the dotted line position shown in Fig. 2 with the nose of the dog 52 encountering the spindle 49 as a stop. With the dog 52 in this position, it functions to hold the pinion 50 out of engagement with the ring gear 37 as more clearly shown in Fig. 6. As in practice it is desirable that the starter be in condition for immediate use, the pilot after starting the engine will rotate the crankhandle 60 in a clockwise direction which will result in the pinion 50 being similarly rotated. As is more clearly shown in Fig. 6, the side 52′ of the dog 52 is slightly slanted so as to be engaged at its lower end by the ends of the teeth of the pinion 50 at the time the same is rotated clockwise. This action of the pinion 50 results in the dog 52 being rotated counter-clockwise upon its pivot from the dotted line position shown in Fig. 2 to an elevated position in which the dog 52 has been moved out of the axial path of the pinion 50 and the pinion 50 is spring urged into mesh with the ring gear 37. From this it should be understood that the construction of the dog 52 is such that it acts as a stop for holding the pinion 50 out of engagement with the ring gear 37 following releasing of the ring gear 37 and thereafter the dog 52 upon rotation of the crankhandle 60 is automatically returned to a position freeing the pinion 50 for engagement with the ring gear 37 and resumes its functions of locking the pinion 50 against counter-clockwise movement.

The present application is a continuation in part of application Serial No. 325,893, filed by me March 25, 1940.

It is within the contemplation of the present invention to house the elongated longitudinally extensible shock cord or its equivalent in parts of the airplane structure other than that disclosed in Fig. 7. For example, the shock cord may be conveniently housed within the wing structure or any other portion of the airplane in which the same will not interfere with the streamlining, will be protected from the weather, and there is adequate clearance for substantial axial elongation and contraction of the energy element.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, what I desire to secure by Letters Patent and claim is:

1. A starter for an engine having a driven shaft, comprising a drive shaft, clutch means connecting the drive and driven shaft, energy storing means operatively associated with the drive shaft, gear means carried by said drive shaft, a manually actuated gear means releasably connected with the first gear means to impart rotation thereto to store up energy in said energy means and for the disengagement of the said second gear means from the first gear means and the engagement of said clutch means.

2. A starter for an engine having a driven shaft, comprising a drive shaft, clutch means connecting the drive and driven shaft, energy storing means operatively associated with the drive shaft, gear means carried by said drive shaft, a manually actuated gear means releasably connected with the first gear means to impart rotation thereto to store up energy in said energy means, actuator means moved upon disengagement movement of the said second gear means from the first gear means to engage the said clutch means, and means to hold the said second gear means against reverse rotation before disengagement of the same from the said first gear.

3. An engine starter apparatus comprising a driving member adapted to engage a member of the engine to be started, and operating means therefor, said means comprising a rotatable shaft geared to said driving member, a gear upon said shaft, a second rotatable shaft, a pinion upon said second shaft meshing with said gear to rotate the same, means for rotating said second shaft to store up energy, energy storing means actuated upon rotation of said gear, means for holding said pinion against rotation in an energy releasing direction, and single means for moving said pinion out of mesh with said gear and for releasing said gear for rotation by said energy storing means.

4. An engine starter apparatus comprising a driving member adapted to engage a member of the engine to be started, and operating means therefor, said means comprising a rotatable shaft geared to said driving member, a gear upon said shaft, a second rotatable shaft, a pinion upon said second shaft meshing with said gear to rotate the same, means for rotating said second shaft to store up energy, energy storing means actuated upon rotation of said gear, a holding pawl engaging with said pinion for holding the same against rotation in an energy releasing direction, and single means for moving said pinion out of mesh with said gear and for releasing said gear for rotation by said energy storing means.

5. A starter for an engine having a driven shaft, comprising a drive shaft, clutch means connecting the drive and driven shaft, a drum carried by and rotatable with the drive shaft, gear means carried by the drum, a manually actuated gear means releasably connected with the first gear means to impart rotation thereto, an elastic cord having parts adapted to be wound around the drum to tension the cord upon actuation of the said second gear means, actuator means rendered operative upon disengagement of the said second gear means from the first gear means to engage the said clutch means, and means to hold the said second gear means against reverse rotation before disengagement of the same from the said first gear.

6. In a starter for an airplane engine, the combination of a driving member adapted to engage a member of the engine, an operating structure for said member comprising a drum geared to said driving member, means for operating said member adapted to extend forwardly from the pilot's seat to said operating structure, a longitudinally extensible resilient member provided at its rear end with means whereby it may be anchored to the rear end of the fuselage, a relatively flexible cable connected to the front end of the resilient member and adapted to be wound upon said drum to store up energy in and exert a direct longitudinal pull on said resilient member, said resilient member and cable being of sufficient length to extend from the rear of the fuselage past the pilot's seat and to said drum, and means adapted to be controlled from the pilot's seat for releasing said energy to rotate said drum and driving member.

7. In a starter for an airplane engine, the combination of a driving member adapted to engage a member of the engine, an operating structure for said member comprising a drum geared to said driving member, means for operating said member adapted to extend forwardly from the pilot's seat to said operating structure, a longitudinally extensible shock cord provided at its rear end with means whereby it may be anchored to the rear end of the fuselage, a relatively flexible cable connected to the front end of the shock cord and adapted to be wound upon said drum to store up energy in, and to exert a direct longitudinal pull on, said cord, said cord and cable being of sufficient length to extend from the rear of the fuselage past the pilot's seat and to said drum, and means adapted to be controlled from the pilot's seat for releasing said energy to rotate said drum and driving member.

8. A starter for an engine having a driven shaft, comprising a drive shaft, clutch means connecting the drive and driven shaft, a drum carried by and rotatable with the drive shaft, gear means carried by the drum, a manually actuated gear means releasably connected with the first gear means to impart rotation thereto, an elastic cord having parts adapted to be wound around the drum to tension the cord upon actuation of the said second gear means, means rendered operative upon disengagement movement of the said second gear means from the first gear means to engage the said clutch means, and manually actuated means operatively connected to said second gear means for imparting disengagement movement thereto and having an operative connection with said clutch operating means.

9. A starter for an engine having a driven shaft, comprising a drive shaft, clutch means connecting the drive and driven shaft, a drum carried by and rotatable with the drive shaft, gear means carried by the drum, a manually actuated gear means releasably connected with the first gear means to impart rotation thereto, an elastic cord having parts adapted to be wound around the drum to tension the cord upon actuation of the said second gear means, actuator means rendered operative upon disengagement of the said second gear means from the first gear means to engage the said clutch means, and means to hold the said second gear means against reverse rotation before disengagement of the same from the said first gear.

10. An engine starter apparatus comprising a driving member adapted to engage a member of the engine to be started, and operating means therefor, said means comprising a rotatable shaft geared to said driving member, a gear upon said shaft, a second rotatable shaft, a pinion upon said second shaft meshing with said gear to rotate the same, means for rotating said second shaft to store up energy, energy storing means actuated upon rotation of said gear, means for holding said pinion against rotation in an energy releasing direction, and means for moving said pinion out of mesh with said gear and for releasing said gear for rotation by said energy storing means.

11. An engine starter apparatus comprising a driving member adapted to engage a member of the engine to be started, and operating means therefor, said means comprising a rotatable shaft geared to said driving member, a gear upon said shaft, a second rotatable shaft, a pinion upon said second shaft meshing with said gear to rotate the same, means for rotating said second shaft to store up energy, energy storing means actuated upon rotation of said gear, a holding pawl engaging with said pinion for holding the same against rotation in an energy releasing direction, and means for removing said pinion out of mesh with said gear and for releasing said gear for rotation by said energy storing means.

JUNE D. MAULE.